3,190,933
CATALYTIC DEHYDROGENATION
Lucien J. Bagnetto, Jr., Bartlesville, Okla., assignor to Phillips Petroleum Company, a corporation of Delaware
No Drawing. Filed Dec. 6, 1961, Ser. No. 157,554
9 Claims. (Cl. 260—669)

This invention relates to the catalytic dehydrogenation of dehydrogenatable materials such as monoolefins and alkyl aromatic-type compounds. In accordance with one aspect, this invention relates to a steam-active dehydrogenation catalyst of improved activity and selectivity. In another aspect, this invention relates to a dehydrogenation process utilizing such a catalyst.

The catalytic dehydrogenation of monoolefins such as the butylenes to butadienes and alkyl aromatic-type compounds to alkenyl derivatives is known in the art. Various catalyst combinations have been developed for the dehydrogenation of these compounds. One catalyst that has been developed for the dehydrogenation of monoolefins and alkyl aromatics comprises an alkalized iron oxide-chromium oxide steam-active catalyst. Although the presently known catalysts are satisfactory for most dehydrogenation reactions, there is still considerable room for improvement, particularly with regard to the activity and selectivity of these catalysts.

The present invention relates to an improved alkalized iron oxide-chromium oxide dehydrogenation catalyst of improved activity and selectivity and to dehydrogenation processes utilizing the improved catalyst.

Accordingly, an object of this invention is to provide a steam-active dehydrogenation catalyst of increased activity and selectivity.

Another object of this invention is to provide an improved process for the dehydrogenation of monoolefins and alkyl aromatic-type compounds.

Other objects, aspects as well as the several advantages of this invent ion will be apparent to those skilled in the art upon further consideration of the specification and the appended claims.

According to the invention, both the activity and selectivity of alkalized iron oxide-chromium oxide dehydrogenation cataylsts are improved by incorporating therein from 2 to 25 weight parts of an alumina-silica gel per 100 weight parts final catalyst composite.

The catalyst composition of the present invention contains from 75-98 weight parts of alkalized iron oxide-chromium oxide and 25-2, preferably 5-15 weight parts, of an alumina-silica gel. The alumina-silica portion of the catalyst consists of 1-15, preferably 2-10 weight percent silica ($SiO_2$) and the ramainder alumina.

The final catalyst composite of the invention will ordinarily contain from 75 to 98 weight parts of alkalized iron oxide-chromium oxide, preferably from 85 to 95 weight parts and the remainder alumina-silica. The amount of alkali (as potassium carbonate) present in the alkalized portion of the catalyst ordinarily ranges from 1-60 weight percent, preferably from 30-60 weight percent. The amount of iron oxide present ordinarily ranges from 30-98 weight percent, preferably from 35-70 weight percent. The amount of chromium oxide present ranges from 1-10 weight percent.

According to the invention, it has been found that incorporation of 2-25 weight parts of an alumina-silica gel in the above alkalized iron oxide-chromium oxide catalysts result in a decided improvement in selectivity which is quite significant in commercial plant operations. Also, it has been found that a higher conversion is obtained when utilizing a catalyst of the invention for dehydrogenation reaction in the presence of steam.

Numerous methods for preparing a catalyst of the invention are available. For example, the catalyst components can be brought together in a mill, such as a hammer mill, and milled to break up the agglomerates to small size, the milled mixture pelleted and dried, and the catalyst used in the dehydrogenation process. Alternatively, the catalyst components can be formed into a paste with a suitable liquid, such as water or a dilute tannic acid solution, and extruded into any desired shape or size. Other methods involving coprecipitation, impregnation, and other known methods can also be used with satisfactory results.

The alumina-silica gel employed according to the invention can be either a coprecipitated gel or a gel produced by mixing the separate wet gels, these procedures being well known in the art. When desired, the remaining ingredients of the catalyst, namely the alkalized iron oxide-chromium oxide ingredients can be formed into a mixture followed by introduction of the alumina-silica gel. It is also within the scope of the invention to combine all of the ingredients simultaneously and form the catalyst into the desired form for use in the dehydrogenation process.

The potassium compound used in the preparation of the catalyst of the invention is preferably potassium carbonate. However, any compound other than the chloride which is at least partially convertible to the carbonate either under the conditions of the preparation of the catalyst or under the initial conditions of use can be used. Examples of such compounds are the hydroxide, nitrate, fluoride, bicarbonate, and acetate.

Various types of iron oxide ($Fe_2O_3$) and chromium oxide ($Cr_2O_3$) are suitable for preparing the catalyst of the present invention. For example, the iron oxide or chromium oxide can be prepared by the thermal decomposition of iron or chromium compounds, such as the oxylate or nitrate, or various types of commercial iron or chromium oxides can be employed. However, it is usually advantageous to utilize an iron oxide wherein substantially all of the particles have a size of 2 microns or less and an average particle size of less than 1 micron.

The catalyst of the invention can be in the form of granules, pellets, powder, spheres, saddles, etc. When desired, the catalyst can be subjected to calcination prior to dehydrogenation, for example at a temperature above about 600° C.

The catalyst of the invention is useful for the catalytic hydrogenation with steam dilution of monoolefins, alkyl aromatics, including alkylpyridines, to produce diolefins, alkenyl aromatics and alkenyl pyridines, respectively. The amount of steam employed during dehydrogenation ordinarily ranges from 1-20 mols of steam per mol of monoolefin or alkyl aromatic charged. The temperature employed during dehydrogenation ranges from 1050–1300° F. although higher and lower temperatures can be employed when desired. However, at temperatures much below 1050° F. the conversion falls off rapidly and with temperatures much above 1300° F. the selectivity of the reaction decreases below the usual desirable limits. Ordinarily, the pressure employed is as low as feasible and substantially atmospheric pressure is utilized. However, elevated pressures can be employed when desired.

Monoolefins most commonly employed in producing diolefins of the same number of carbon atoms according to the invention are butenes and pentenes, butadiene and pentadiene being the products of the process. However, the invention is also applicable to the hydrogenation of ethylbenzene to styrene, methylbutane to isoprenes, e.g., 2-methylbutene to isoprene, 2-methyl-5-ethylpyridine to 2-methyl-5-vinylpyridine and the like. Although the invention is applicable generally to monoolefins and alkyl aromatics or alkylpyridines, it is particularly applicable to monoolefins containing from 4 to 8 carbon atoms and alkyl aromatics or alkylpyridines with 1 to 4 alkyl groups each having 6 or less carbon atoms with at least one alkyl group of 2 or more carbon atoms, these being most applicable from the standpoint of yield, selectivity and economics.

The process is ordinarily carried out by forming a preheated mixture of the monoolefin and steam, passing the charge mixture over the catalyst at the desired temperature and recovering the product from the reaction mixture coming from the catalyst cases. Recycle of unconverted monoolefins is utilized in substantially all applications. The catalyst chambers can be adiabatic or isothermal, although isothermal reactors are more desirable from a processing standpoint.

A more comprehensive understanding of the invention can be obtained by referring to the following illustrative example which is not intended, however, to be unduly limitative of the invention.

EXAMPLE

A series of runs was carried out for the dehydrogenation of butenes wherein the activity and selectivity of a standard alkalized iron oxide-chromium oxide catalyst, with and without prior art promoters, were compared with the activity and selectivity of a catalyst of the invention.

The tests in the following table were each carried out at a temperature of 1130° F., 400 volumes of butenes (gas) an hour, 4800 volumes of steam an hour, and atmospheric pressure. The conversion and selectivity of each test is shown along with the selectivity of a comparison standard catalyst at the same conversion level, this being obtained from a selectivity-conversion correlation for this catalyst obtained from a number of tests.

The standard catalyst was made by milling the ingredients in a ball mill to effect good mixing and grinding, and the resulting mixture was then pelleted in ⅛ inch by ⅛ inch pellets. The remaining catalysts were prepared in a like manner with the exception of the inclusion of the indicated amount of the oxide gel.

Table I

| Catalyst Number | Composition, Wt. Percent | Conversion of Butenes | Selectivity to Butadiene | Selectivity of Std. Catalyst | Percentage Pt. Increase |
|---|---|---|---|---|---|
| | 52K$_2$CO$_3$—45Fe$_2$O$_3$—3CR$_2$O$_3$ | 27 | 83 | 83 | |
| 1 | Std.+10% SiO$_2$ | 36 | 77 | 76 | +1 |
| 2 | Std.+25% SiO$_2$ | 25 | 85 | 84 | +1 |
| 3 | Std.+10% Al$_2$O$_3$ | 29 | 81 | 81 | 0 |
| 4 | Std.+10% Si—Al(a) | 27 | 84 | 83 | +1 |
| 5 | Std.+10% Al$_2$O$_3$(b) | 33 | 83 | 79 | +4 | a Actual composition of Si—Al: 87 SiO$_2$—13Al$_2$O$_3$ (coprecipitated).
b Actual composition of Al$_2$O$_3$-stabilized-with-silica: 95Al$_2$O$_3$—5SiO$_2$ (coprecipitated).

As will be evident to those skilled in the art, many variations and modifications of this invention can be practiced in view of the foregoing disclosure. Such variations and modifications are clearly believed to come within the spirit and scope of the invention.

I claim:

1. In the dehydrogenation of monoolefin and alkyl aromatic hydrocarbon reactants, the step which comprises contacting at least one of said reactants and steam with a catalyst consisting essentially of (a) 2–25 weight parts of alumina-silica gel containing 1–15 weight percent silica and the balance alumina, and (b) from 75–98 weight parts of an alkalized iron oxide-chromium oxide catalyst containing 1–60 weight percent potassium carbonate, 1–10 weight percent chromium oxide and 30–98 weight percent iron oxide.

2. In the dehydrogenation of monoolefin and alkyl aromatic hydrocarbon reactants, the step which comprises contacting at least one of said reactants and steam with a catalyst consisting essentially of (a) 5–15 weight parts of alumina-silica gel containing 2–10 weight percent silica and the remainder alumina, and (b) from 85–95 weight parts of an alkalized iron oxide-chromium oxide catalyst containing 30–60 weight percent potassium carbonate, 1–10 weight percent chromium oxide and 35–70 weight percent iron oxide.

3. In the dehydrogenation of butenes, the steps which comprise contacting a mixture of butenes and steam with a catalyst consisting essentially of (a) 5–15 weight parts of alumina-silica gel containing 2–10 weight percent silica and the remainder alumina, and (b) from 85–95 weight parts of an alkalized iron oxide-chromium oxide catalyst containing 51–59 weight percent potassium carbonate, 1–10 weight percent chromium oxide and 39–47 weight percent iron oxide.

4. In the dehydrogenation of butenes, the steps which comprise contacting a mixture of butenes and steam with a catalyst consisting essentially of (a) 10 weight parts of an alumina-silica gel containing 5 weight percent silica and 95 weight percent alumina and (b) 90 weight parts of an alkalized iron oxide-chromium oxide mixture containing 52 weight percent potassium carbonate, 3 weight percent chromium oxide and 45 weight percent iron oxide.

5. The process set forth in claim 4 in which the butene is admixed with 1–20 volumes of steam and the temperature of the mixture is from about 1050–1300° F. during the time the mixture is in contact with the catalyst.

6. A catalyst composition active for dehydrogenation consisting essentially of 2–25 weight parts of (a) an alumina-silica gel and 75–98 weight parts (b), (a) consisting of 85–99 weight percent alumina and 1–15 weight percent silica, and (b) consisting of 1–60 weight percent potassium carbonate, 1–10 weight percent chromium oxide and 30–98 weight percent iron oxide.

7. A catalyst according to claim 6 wherein the amount of (a) ranges from 5–15 weight parts and (a) consists of 2–10 weight percent silica and the balance alumina and the amount of (b) ranges from 85–95 weight parts and (b) consists of 30–60 weight percent potassium carbonate, 1–10 weight percent chromium oxide and 35–70 weight percent iron oxide.

8. A catalyst according to claim 6 wherein (b) consists of 51–59 weight percent potassium carbonate, 1–10 weight percent chromium oxide and 39–47 weight percent iron oxide.

9. A catalyst composition consisting essentially of 90 weight parts of (a) composed of 52 weight percent potassium carbonate, 3 weight percent chromium oxide and 45 weight percent iron oxide, and 10 weight parts of (b) composed of an alumina-silica gel of 95 weight percent alumina and 5 weight percent silica.

References Cited by the Examiner

UNITED STATES PATENTS 2,916,531  12/59  Armstrong et al. _____ 260—680
2,971,927  2/61   Price _____ 252—455
2,990,432  6/61   Fleming et al. _____ 252—455

ALPHONSO D. SULLIVAN, *Primary Examiner.*